G. A. JULIUS.
RACE TOTALIZATOR.
APPLICATION FILED MAR. 5, 1918.

1,273,067.

Patented July 16, 1918.
13 SHEETS—SHEET 1.

Inventor.
G. A. Julius.
By H. R. Kerslake
Atty.

G. A. JULIUS.
RACE TOTALIZATOR.
APPLICATION FILED MAR. 5, 1918.

1,273,067.

Patented July 16, 1918.
13 SHEETS—SHEET 3.

Inventor.
G. A. Julius.
By H. R. Kerslake
Atty.

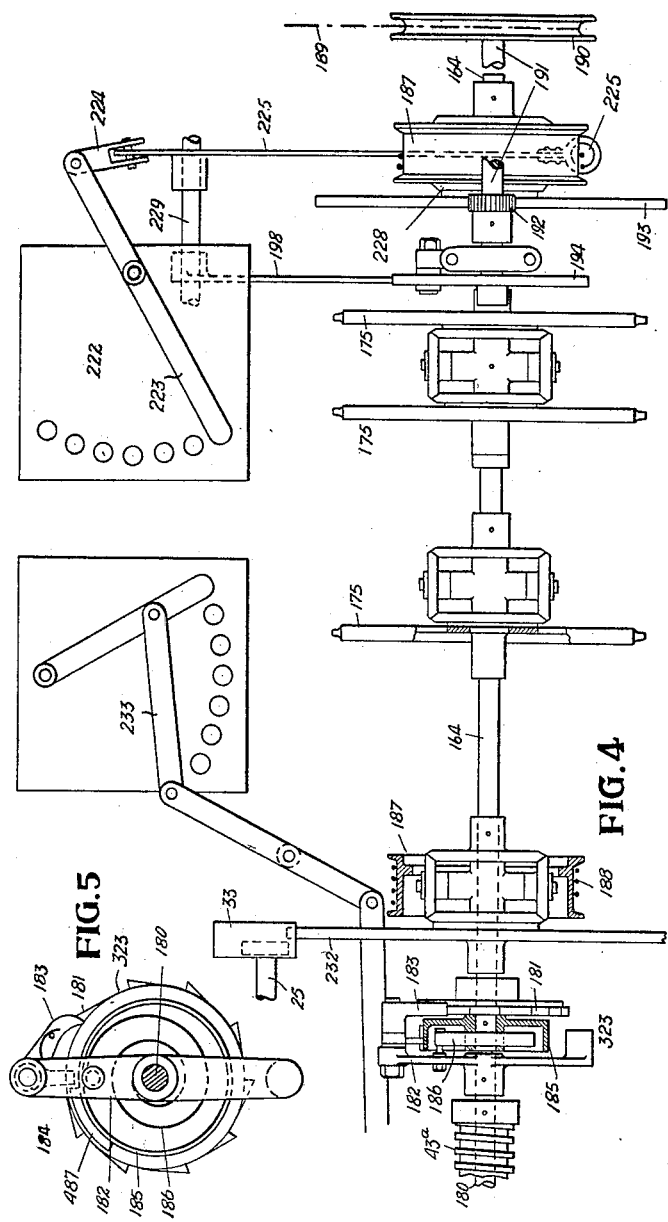

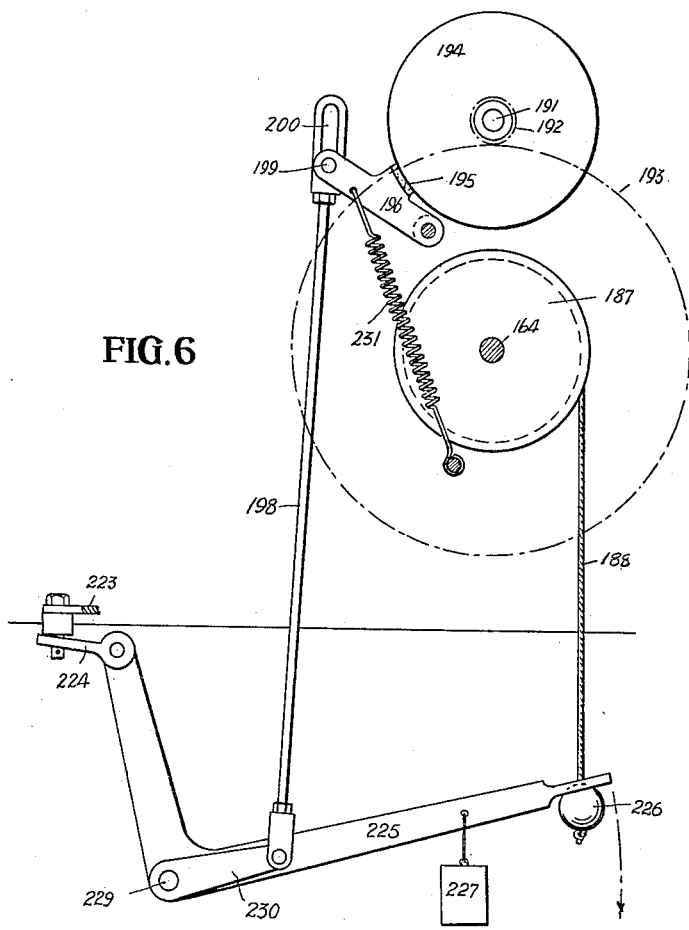

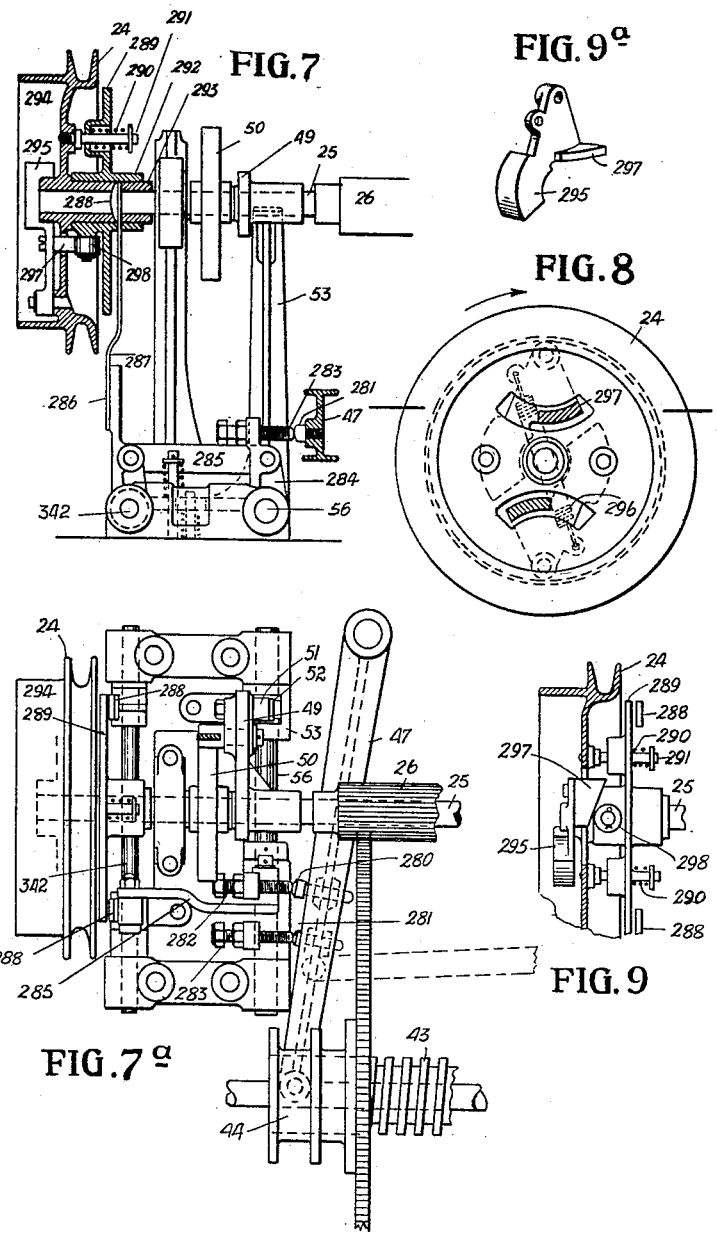

G. A. JULIUS.
RACE TOTALIZATOR.
APPLICATION FILED MAR. 5, 1918.

1,273,067.

Patented July 16, 1918.
13 SHEETS—SHEET 7.

Inventor.
G.A.Julius.
By H.R.Kerslake
Atty.

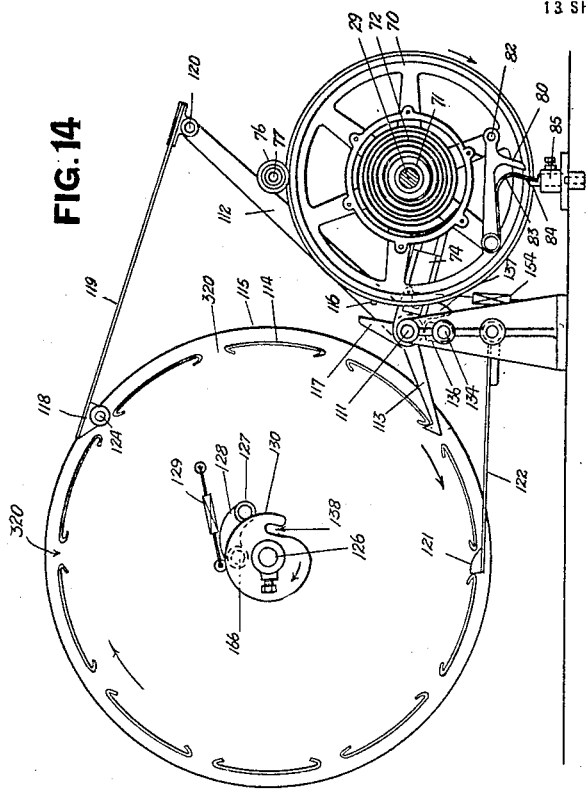

G. A. JULIUS.
RACE TOTALIZATOR.
APPLICATION FILED MAR. 5, 1918.
1,273,067.
Patented July 16, 1918.
13 SHEETS—SHEET 9.
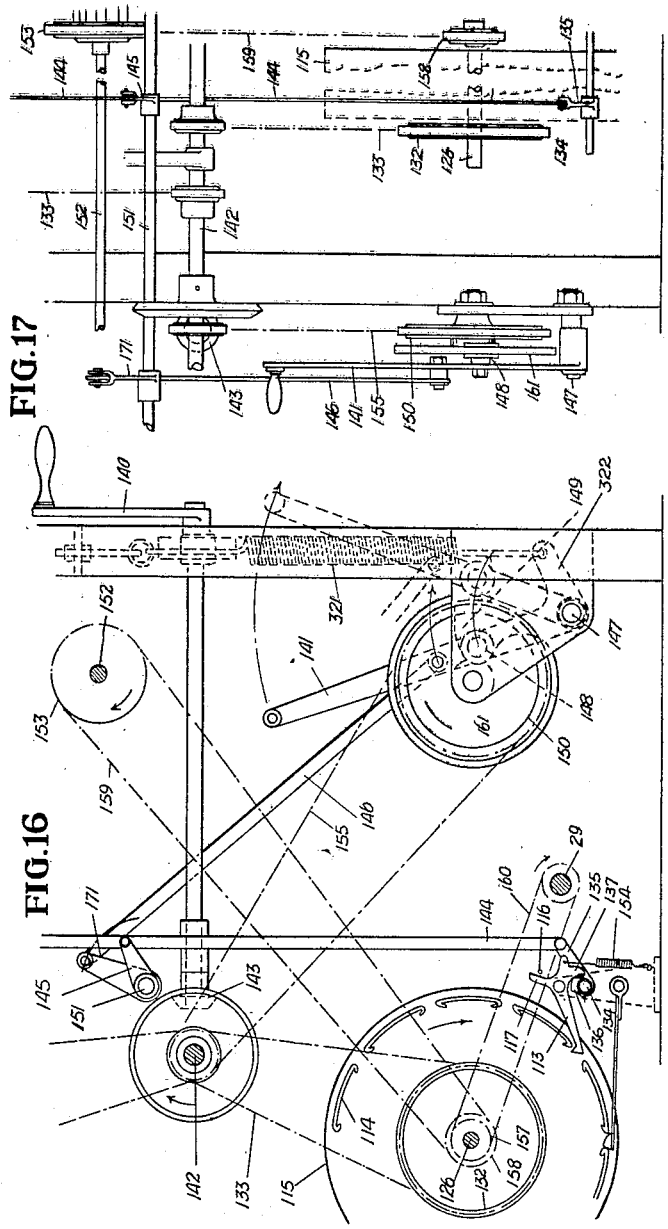
Inventor.
G.A. Julius.
By H.R. Kerslake
Atty.

G. A. JULIUS.
RACE TOTALIZATOR.
APPLICATION FILED MAR. 5, 1918

1,273,067.

Patented July 16, 1918.
13 SHEETS—SHEET 10.

FIG.20ª

Inventor
G.A. Julius,
By L.R. Kerslake
Atty.

G. A. JULIUS.
RACE TOTALIZATOR.
APPLICATION FILED MAR. 5, 1918.

1,273,067.

Patented July 16, 1918.
13 SHEETS—SHEET 13.

Inventor.
G. A. Julius
By H. R. Kerslake
Atty.

UNITED STATES PATENT OFFICE.

GEORGE ALFRED JULIUS, OF SYDNEY, NEW SOUTH WALES, AUSTRALIA.

RACE-TOTALIZATOR.

1,273,067.  Specification of Letters Patent.  Patented July 16, 1918.

Application filed March 5, 1918. Serial No. 220,475.

*To all whom it may concern:*

Be it known that I, GEORGE ALFRED JULIUS, subject of the King of Great Britain and Ireland, residing at Culwulla Chambers, Castlereagh street, Sydney, New South Wales, Australia, have invented certain new and useful Improvements in Race-Totalizators, of which the following is a specification.

This invention consists in mechanically operated horse totals and grand total counter and indicator mechanism controlled electrically through manually actuated contacts which are operated by ticket selling clerks or through automatic ticket printing or issuing machines. Any number of unit elements may be included in the machine assembly to integrate in the horse totals and also in the grand total the values of tickets issued from a plurality of separate ticket selling booths or any number of horses. Similar counter and indicator mechanism is used in the horse total and grand total sections of the machine. This mechanism is competent to sum and indicate movements corresponding with issues of tickets, irrespectively of the rapidity at which such movements are transmitted to the machine, and irrespectively of the transmission of a plurality of such movements to the machine simultaneously. Certain minor modifications in the counter and indicator mechanism are however desirable in the "grand total" section of the machine, and provision is made to effect speeding up the mechanism to enable it to respond to heavy demands made on it.

A complete totalizator apparatus according to this invention comprises an assembly of separate groups of horse elements and a grand total element to which all the horse elements are geared. Each horse element includes an integrating escapement (the wheel of which controls one member of an epicyclic train) for every ticket issuing machine in the system which is fitted for the issue of tickets on such horse, and the construction is such that without disturbing existing parts any necessary number of such escapements may be added in any one or more of the horse elements to admit of the connecting up thereto of additional ticket issuing devices when it is required to expand the system to provide for an increased number of ticket selling booths. The grand total element includes an integrating epicyclic unit for every horse element. The construction is such that without disturbing existing parts, and without adding to or varying the transmission or the indicators, any necessary number of such escapements may be added to provide for additional horses when it is required to expand the system to cover a large field of competitors. The initial movements affecting the escapements in the horse elements and through them the grand total elements are communicated electrically from the ticket issuing booths, a separate connection being necessary for every horse from every booth, unless where any particular booth (or booths) is allocated for issue of tickets on particular horses only, in which case connections for those horses only will be called for from such booths, with appropriate escapements in the respective horse elements.

In the drawings Figure 1 is an incomplete diagrammatic view showing seven horse total indicators and a grand total indicator, together with elements associated therewith for effecting original movements in the horse indicators and for transferring to and integrating the horse totals in the grand total;

Fig. 4 is a sectional plan of portion of a grand total integrating shaft with epicyclic train and weight drive drums and spring transfer drum thereon, showing also drive control rheostats, braking mechanism, and step-by-step motion transfer mechanism associated with said spring drum;

Fig. 5 is an elevational view of the spring drum and step-by-step motion transfer mechanism forming part of the grand total integrating shaft equipment;

Fig. 6 is an elevational detail view explanatory of the brake and weight rewinding control on the transmission to the grand total indicator;

Fig. 7 is a sectional elevational view of the automatic release and brake and check mechanism on the transmission element through which the integrated totals are carried from the accumulator to the indicator; and Fig. 7ᵃ is a corresponding plan;

Fig. 8 is a sectional end elevation of the centrifugal brake in the belt drum, Figs. 7 and 7ª;

Fig. 9 is a broken vertical section illustrating the same; and Fig. 9ª is a detail perspective view of one of the centrifugal brake weights;

Fig. 14 is a sectional elevation explanatory of the mechanism for operating and resetting the indicator drums;

Fig. 15 is a corresponding end elevation;

Fig. 16 is an end elevational view explanatory of the mechanism for resetting the indicator drums to zero after the close of the count;

Fig. 17 is a corresponding front elevational view;

Figure 2:
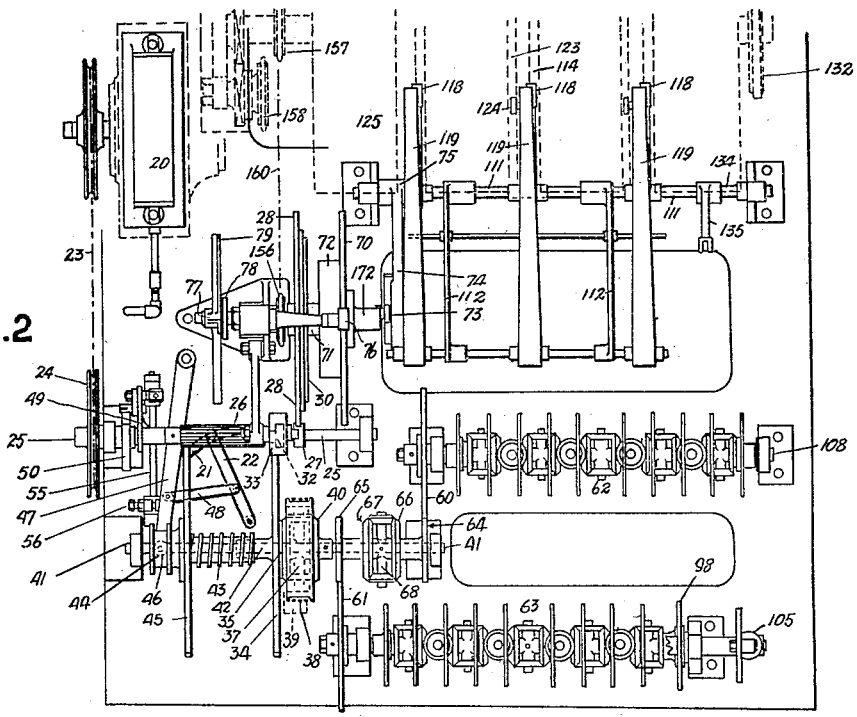
Fig. 2 is a plan view of the mechanism forming a horse total element geared for integrating therein the value of tickets issued on a particular horse from any one or all of twenty ticket issuing offices.
Figure 20:
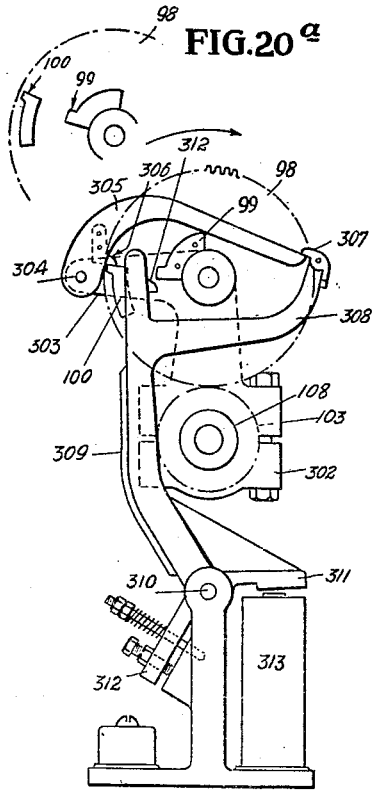
Fig. 20 is a side elevational view of a one tooth or "all round" escapement control.
Figure 21:
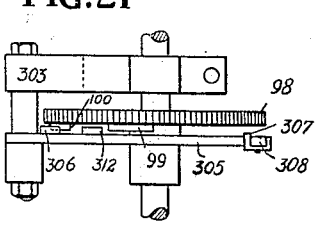
Figure 22:
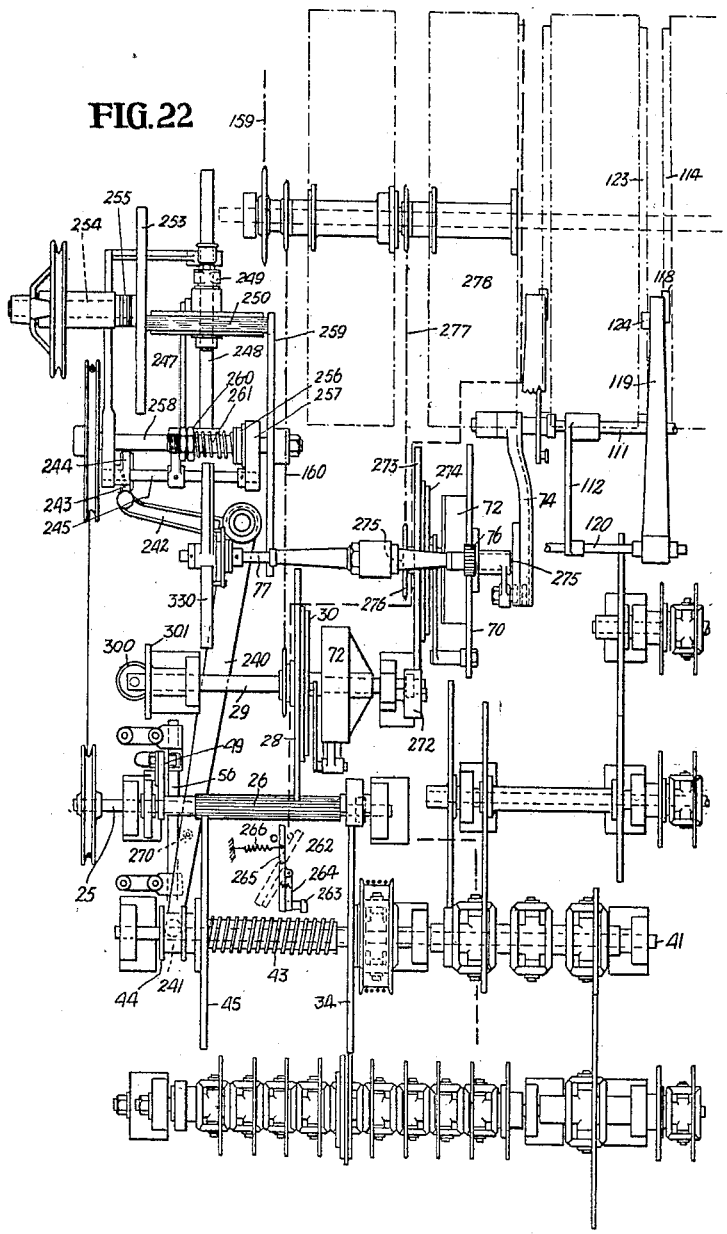
Figure 23:
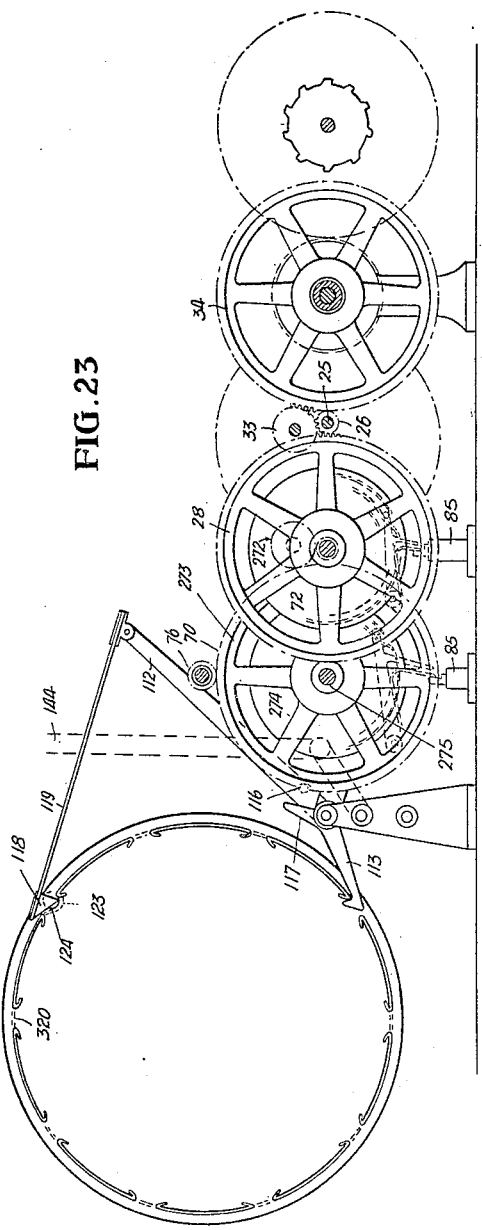
Figure 24:
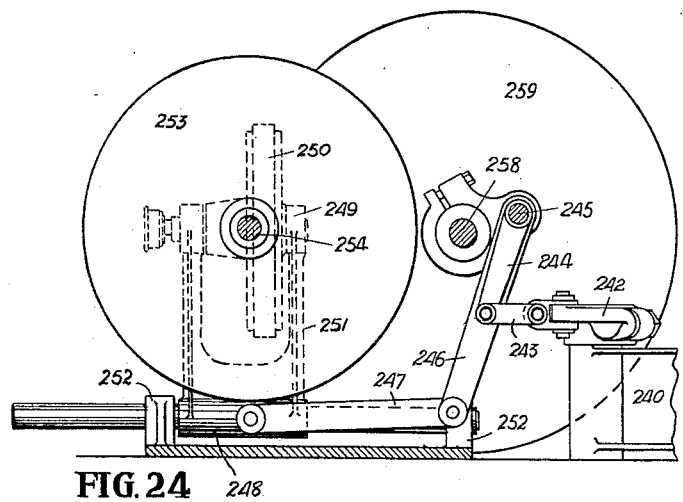

Fig. 20ª is a fragment showing stop lugs on the side of the escapement wheel; and Fig. 21 is a fragment plan corresponding with Fig. 20;

Fig. 22 is a plan view illustrating an arrangement of mechanism generally corresponding with that shown in Fig. 2, but incorporating certain features not shown in Fig. 2 which are desirable particularly in the case of extensive installations;

Fig. 23 is a vertical sectional view taken on the dotted zig-zag line through Fig. 22;

Fig. 24 is a sectional elevational view explanatory of friction drive and control mechanism shown in Fig. 22.

Figure 25:
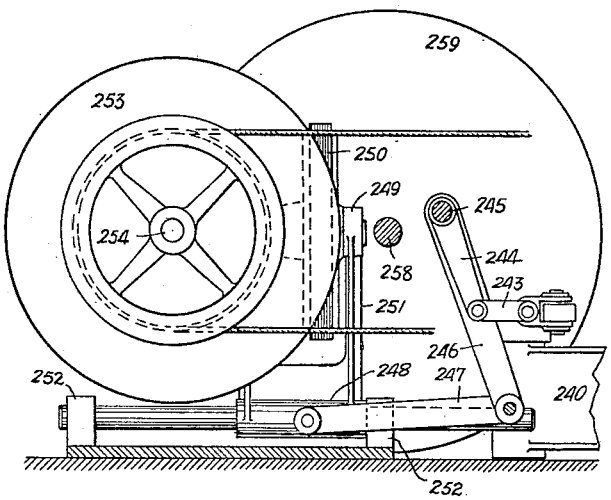

Fig. 25 is a similar view showing the drive pinion moved to the outer or maximum speed position on the face wheel through which power is transmitted to the mechanism from a motor.

Throughout the drawings the same figures of reference indicate the same parts or corresponding parts.

20 is an electric motor, the circuit for which is governed by a rheostat 21 having a contact arm 22 which is moved by mechanism hereinafter described. The first rheostat notch position supplies sufficient current to the motor to keep the armature turning slowly to facilitate rapid speeding up when the contact arm 22 is moved to higher notches, the belt 23 being tensioned to slip sufficiently for this purpose.

Figure 13:
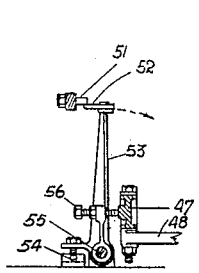
Fig. 13 is a fragment cross sectional elevational view corresponding therewith.
Figure 12:
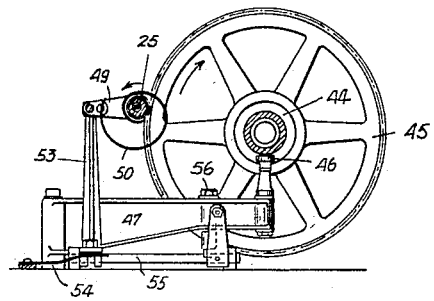
Fig. 12 is an end elevational view explanatory of the rheostat control mechanism and the transfer motion stop in the transmission between the epicyclic train accummulators and the indicators.

The belt 23 drives the pulley 24 on the spindle 25 of the drum pinion 26. A transfer pinion 27 on the spindle 25 transfers rotary motion of said spindle to the wheel 28, which turns freely on its carrier spindle 29. This wheel is armed on one face with a spiral groove cam 30 (see Fig. 10) having its last outer convolution joggled outward at 31. The spindle 25 is also back geared through the pinions 32 and 33 with the spur wheel 34 which is mounted on the cheek wheel 35 of an epicyclic gear box and runs free on the shaft 41. The rotor carrying the star wheels of this box is carried within a drum 37, over which is wound a flexible cord 38 held under constant tension, tending to rotate the rotor, by a weight 39. The other cheek wheel 40 of this box is pinned to the shaft 41. This shaft 41 is also pinned to the "accumulator" barrel which is armed externally with a helical thread 43 which works in an externally grooved nut 44 attached to the large spur wheel 45 which meshes with the drum pinion 26. A roller bushed finger 46 works in the groove in the nut 44, and when the barrel turns, moves the control lever 47, which is linked at 48 to the contact arm 22 of the rheostat 21. The lever 47 also controls the transfer motion stop which is shown in detail in Figs. 12 and 13. The spindle 25 carries the eye of a scroll spring 50, and the tail of this spring controls a loose lever arm 49 fitted with a catch tooth 51. The catch tooth 51 is engageable by the striker 52 on the head of a rocking post 53, and a leaf spring 54 tends to force this rocking post sidewise on its pivot 55 so as to clear the striker 52 from the catch tooth 51, and thus free the shaft 25 for rotation in the direction indicated by the arrow, Fig. 12. This rocking movement of the post 53, is however, prevented by an adjustable contact stop 56, which bears against the side of the lever 47, so that when the nut 44 is in its extreme outer position, rotation of the shaft 25 is blocked because the catch tooth 51 is then held by the striker 52, and the rheostat contact is held on the first notch (see Fig. 2). When, however, the shaft 41 is rotated, the nut 44 is caused to traverse to the right along the barrel thread 43, the teeth of the wheel 45 sliding on the teeth of the drum pinion 26 to permit the traverse of the wheel 45 along the helically threaded drum 43. When this traverse movement is commenced the shaft 25 is freed by the withdrawal of the striker 52, and it is rotated by the motor 20 which is geared to it through the belt 23 and the wheel 24, and the drum pinion 26 which is pinned to the shaft 25 turns the wheel 34; meantime the rheostat arm 22 is swept over the rheostat contacts by the traverse movement of the nut 44 so as to give the motor 20 more current and speed it up, thereby increasing the rate of rotation of the pinion 26, and consequently the speed of the wheel 45 and other parts. The rotation thus applied to the wheel 45 causes the nut 44 to run back on the helical thread 43, thus finally bringing back the rheostat arm 22 to the first notch and restoring the rocking post 53 to the outer position shown in Fig. 13. In that position further rotation of the shaft 25 is arrested, because the catch tooth 51 on the end of the arm 49 contacts with the striker 52, the resilience of the spring 50 operating to buffer the stopping movement and so prevent concussion.

As shown in Fig. 2, two epicyclic gear trains 62—63 each fitted with ten escapement wheels are geared to the accumulator shaft 41. These geared trains may contain a greater or lesser number of escapement wheels, or there may be only one train, or there may be three or more trains of such gears fitted with such escapements. In each case the epicyclic train terminates in one epicyclic box, the rotor of which is keyed or pinned to the way shaft on which the train is mounted, in order that the final motion of the train, which is the totality of the motions of the several escapement wheels fitted on that train, shall be transferred to the shaft 41. The gearing from the train 62 is shown at 60—64, and the gearing from the train 63 is shown at 61—65. The wheels 64—65 respectively are mounted on the cheeks 66—67 respectively of an epicyclic box, the rotor 68 of which is pinned to the shaft 41; consequently through said epicyclic box the shaft 41 receives the totality of motions of the two epicyclic train shafts, the gearings 60—64 and 61—65 being proportioned so that the rotations of the shaft 41 shall correspond with the total of the rotations of the way shafts which carry the trains 62 and 63.

These shafts 62 and 63 are maintained under constant torsion by the counterweight 39. The cord of said counter weight is wound on the drum 37, and said drum is carried on the rotor of an epicyclic box; one cheek 40 of said box is pinned to the shaft 41; its other cheek 35 is fastened to the wheel 34, said wheel being free to turn on the shaft 41, but permitted to turn only when the shaft 25 turns. It is geared to said shaft as before stated through the pinions 32 and 33. The shaft 25 is under constant torsion due to the pull of the belt 23 from the motor 20. Until an escapement is released the mechanism is locked. When, however, an escapement is released or one, two, or more escapements are released simultaneously, the epicyclic rotor 68 is permitted to turn with its shaft 41 under the torsion applied to it from the weight drum 37.

Rotation of the shaft 41 turns the spiral barrel 43, causing the nut 44 with the wheel 45 to traverse it. Immediately this traverse movement starts, the striker 52 is freed. When that happens, the shaft 25 is rotated by the belt gear 23, and the drum pinion 26 turns the wheel 45, causing it to traverse backward (to the left) on the helical drum 43, at the same time turning the back gears 32—33, and through them the wheel 34, thereby rewinding the weight 39. The weight 39 therefore "floats." It operates positively to maintain the epicyclic train shafts under torsion, so that when released the escapements "get away" tooth by tooth; as quickly as the weight 39 runs down it is rewound on the drum 37.

When the motion of the epicyclic train is rapid the traverse movement of the nut 44 and wheel 45 is faster than the anti-traverse movement applied to it through the rotation of the drum pinion 26, and as the difference between the traverse and anti-traverse movements increases, the rheostat arm 22 is moved over the contacts to give more current to the motor 20 and speed up the shafts 25 until a speed is reached at which the rate of anti-traverse movement exceeds the rate of traverse movement. Thereupon the reverse action starts, and the rheostat arm 22 is brought back to the lower rheostat notches, and the motor 20 is gradually slowed up.

Finally when the nut 44 comes to its extreme left position, the striker 52 is moved into the path of the catch tooth 51 and the rotation of the shaft 25 is positively stopped. There is thus a constant floating action, which may be termed "accumulator" action, obtained which operates to effect rotation of the shaft 25, in correspondence with the number of escapement releases which have occurred, the transfer being slow at starting up and at stopping but becoming very rapid when the escapements are being released at a fast rate. It is thus insured that the mechanism in which the escapement movements are summed is capable of taking up all those movements at any rate and delivering them up in its one time, and is yet assured of coming to rest and starting up very slowly, so that the parts may be made light. Risk of shock and concussion are thus obviated.

It is thus assured that the totaling mechanism can take care of a rapid release of the escapements which occurs during times while tickets are being issued rapidly, and it will be noted that the transfer of the totals from the accumulator proceeds simultaneously with and may proceed subsequently to the receipt of motions in the accumulator via the escapements.

This is a feature of major importance in this machine, as it makes practicable the accumulating or storing up of the aggregate of a large number of movements derived from different points, so that while all such movements are recorded transmitted and ultimately indicated in the horse totals and in the grand total the initial movements are not transferred directly but the recording is effected independently of the initial movements at a progressively increasing rate of speed when necessary for overtaking the count, and, toward the finish of that operation, at a gradually diminishing rate of speed, so that the mechanism starts and comes to rest without shock or jar.

The weight 39 maintains the shaft 41 under constant torsion, so that said shaft 41 always tends to rotate when the mechanism which prevents its rotation operates to liberate it. The wheel 34 which is pinned to one of the cheek wheels 35 of the weight drum epicyclic box 37, is, as before explained, reversely geared to the shaft 25; consequently when the shaft 25 turns, the weight 39 is rewound on the drum 37. The weight therefore acts as a floating weight so that its cord unwinds to apply rotational movement to the shaft 41, and the nut 44, and is rewound on the drum 37, as the overtaking movement occurs in which the wheel 45 is traversed back along the thread 43 to its left hand position where it is shown in Fig. 2.

The escapement train shafts are shown spur geared to the shaft 41 through an epicyclic box. Chain gearing working on sprocket wheels may be used instead of spur gear. If more than two escapement trains are fitted, one or more additional epicyclic boxes must be fitted in a train on the shaft 41 to receive through chain or spur gears the final movement of the several way shafts which carry the epicyclic trains, and to integrate said movements so that the number of turns permitted to the shaft 41 corresponds with the total of the number of turns made by the several way shafts. The weight 39 is proportioned to apply sufficient torque to the way shafts through the epicyclic boxes on the shaft 41 to cause the escapement wheels to turn freely immediately they are liberated by their respective escapement rockers.

Each of the epicyclic gears in the trains 62 and 63 is controlled by an escapement rocker acting on an escapement wheel which is mounted on the epicyclc box rotor, and the angle through which any particular escapement wheel turns and the consequent extent of movement permitted to the shaft 41 depends upon the tooth spacing of such escapement wheel. Provision may therefore be made for the issue of tickets of any desired values by determining the toothings of the escapement wheels in relation to such values respectively, so that each ticket issue movement transmitted from a ticket issuing office permits the escapement wheel to which such movement is communicated to move through an angle proportioned to the value of the ticket issued, and thereby to permit rotation of the shaft 41 through an angle corresponding therewith.

As the end wheels 60 and 61 of the trains 62, 63 have a rotational movement equal to the sum of the rotational movements of all the escapments in the respective trains 62, 63, the shaft 41 is permitted to turn in correspondence therewith, and in view of the gearing of the end wheels 60 and 61 through the epicyclic box 66—67—68, transmission of movements through the shaft 41 derived from all the epicyclic trains may proceed simultaneously. It is immaterial whether two or any greater number of escapements in any or all of these epicyclic trains are in operation simultaneously.

Figure 10:
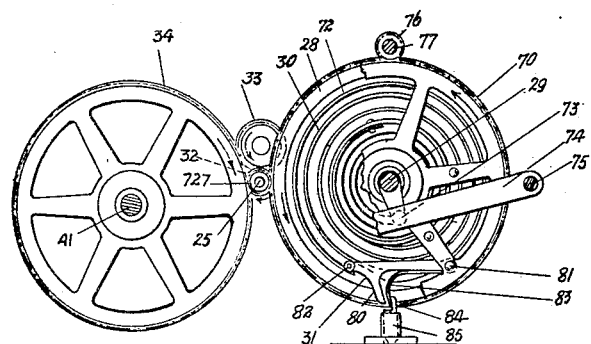
Fig. 10 is a sectional elevation explanatory of the overrunning transfer mechanism and its gearing for delivering the accumulated rotations from the escapement trains to slow acting reciprocating mechanism for operating the indicators.
Figure 11:
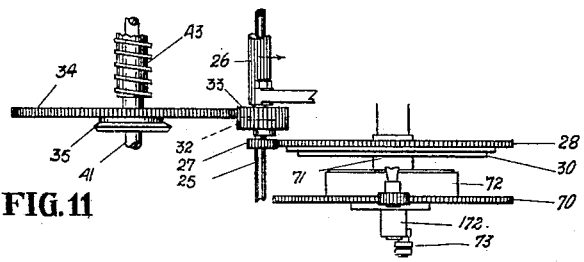
Fig. 11 is a corresponding top plan.

Fig. 10 shows the relation of the shafts to the wheels 34 and 28, also of the wheel 70 and the pinions 27, 32 and 33. A portion of the wheel 70 has been broken away to exhibit rearwardly of it the face of the wheel 28 which carries the spiral track 30, which as already described is joggled in its outermost convolution as shown at 31.

For the enlargement of the apparatus to provide for an increased number of ticket issuing machines to be connected up, epicyclic gear trains such as 62, 63 are geared up to the shaft 41 through the epicyclic box thereon so that the sum of the final rotations of all the gear train shafts are summed in the rotation of the shaft 41. Structural alteration of any of the mechanism is therefor unnecessary for the said purpose, the standing parts being so designed as to admit of the connecting up to the shaft 41 of any required number of epicyclic trains for the said purpose. Similarly, any number of horse totaling and indicating units may be connected up through intermediate shafts where necessary to the grand total integrating shaft 164, in the manner shown in Fig. 1. The system is therefore a "unit" system, which permits the expansion by the addition of "units" without necessitating reconstruction or reorganization of the accumulating, transferring, and indicating mechanism.

In the indicator driving mechanism, the hub 71 of the wheel 28 runs freely on the shaft 29. The eye of the spiral spring 72 is secured to the hub 71, and the tail of said spring is attached to the wheel 70. The hub piece 172 of the wheel 70 carries a crank pin 73 which works in a slotted arm 74, and through it operates the indicator mechanism. The sweep of the pin 73 in the slot in the arm 74, said arm being fulcrumed at 75, acts to apply to the arm 74 a quick upward movement and a slow downward movement. A pinion 76 gearing into the wheel 70 is keyed into the end of a short shaft 77 which carries a free wheel hub 78 and air vanes 79 thereon. Rotative movement of the wheel 70 is applied to the shaft 77 through the pinion 76, and the air vanes 79 brake its rotation, so that the wheel 70 cannot rotate faster than a predetermined rate. A stop mechanism is also fitted to insure that the wheel 70 will always come to rest at the one position, thereby to insure that the indicator operating mechanism will be brought back to full idle position at the end of each indicator advance movement.

The wheel 70 can continue to operate the indicator after the wheel 28 has come to rest. This provision for temporary storing motion in course of transmission from the accumulator and applying it at a relatively regular rate to the indicators is necessary in practice, because thereby it is made possible to use indicator drums of considerable size, inertia effects being obviated owing to the relatively slow maximum rate at which the mechanism is permitted to turn the indicator drums. It is impossible in practice to advance indicator drums, of any useful size "in step" with the maximum transmitted rate of issue of tickets, but it is practicable to advance them at or in some excess of the average rate of such issue, and consequently the interposition in the mechanism of means whereby irregular and fast movements can be applied to an ultimate driving wheel to turn it at not more than a predetermined rate of speed while not limiting the rate of transmission of the issue movements to the motion accumulator is a point of very great practical importance. The mounting of the air vanes 79 on the free wheel hub is also important, as when the wheel 70 is suddenly brought to rest, the momentum of the vane wheel 79 is permitted to expend itself without tending to turn the shaft 77 with it.

The unit drum 125 is fitted with a driving sprocket 157 which is connected by a chain belt to the sprocket 156, which is keyed on the shaft 29. The rotations of the wheel 70, which is also pinned to the shaft 29, are thus communicated directly to the unit drum 125, while decimal movements are applied to the tens, hundreds and thousands drums respectively, by means of the pull arms 119 which are hung on a gang bar 120 which is carried on the upper ends of the rock arms 112. These rock arms are mounted on the rock shaft 111 to which the shoulder of the slotted arm 74 is keyed. As said arm 74 performed one reciprocation for every complete turn of the wheel 70, the pull arms 119 perform one reciprocation for every complete rotation of the unit drum 125.

Figure 18:
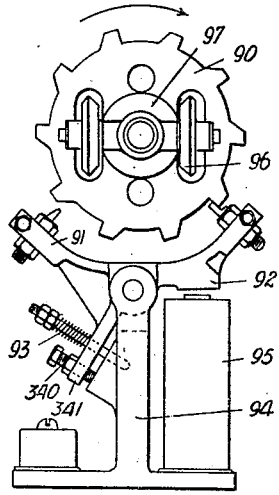
Fig. 18 is an elevational view of a ten tooth escapement control on an epicyclic box in the primary epicyclic gear train.
Figure 19:
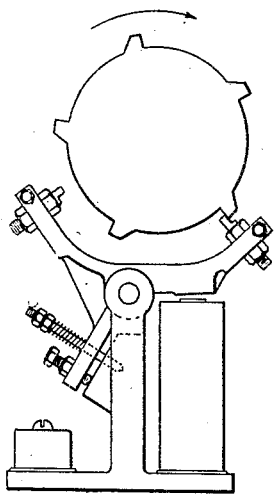
Fig. 19 is a corresponding view of a five tooth escapement.

The escapement mechanism shown in the drawings are solenoid operated. As in usual practice, when a train of epicyclic gears is used, the neighboring rotors move in opposite directions. This is fully explained in my patent for the Dominion of New Zealand No. 31813 dated 15th, August 1912. In setting up the trains, therefore, every alternate escapement wheel must be toothed right-hand and left-hand respectively. The right-hand arrangement is shown in Fig. 18 for a one unit escapement. Similarly, for the two unit escapement, right-hand toothing is shown in Fig. 19. The only other mechanical difference between the right and left hand escapement mechanisms is that the escapement rockers are arranged right-hand or left-hand to correspond with the wheel toothing.

In a totalizator organization in which tickets at 10/—, £1/—/— and £5/—/— respectively are issued, the particular gear proportions shown in the drawings are used, the escapement, Fig. 18 being a 10/— escapement, that shown in Fig. 19 a £1 escapement, and that shown in Fig. 20 a £5 escapement. In the first mentioned case, each escapement wheel has ten teeth; in the second case, each escapement wheel has five teeth and in the third case the escapement wheel has the equivalent of one tooth only and is fitted with a hit and miss trip mechanism, instead of an escapement release rocker, and is geared at 2:1 to the way shaft 108 of the epicyclic train in which said wheel is contained.

The gear proportions are such that the crank 73 makes one revolution for every twenty release movements of a 10/— escapement, or for every ten release movements of a £1 escapement, or for every two movements of a £5 escapement. In Figs. 18 and 19, 90 are the escapement wheels, 91 being the escapement rockers, 92 armatures, 93 retiring springs, 94 the standards, and 95 the operating solenoids. 340 are adjusting screws on the rocker tail pieces 341, and 96 are the planet wheels in the epicyclic rotors 97. In Fig. 20 the bracket 302 which carries a ball bearing in which the shaft 108 runs, is fitted with a bracket arm 303 which carries a pivot 304 on which a bent arm 305 is loosely hung. Upon this arm is fixed a lug 306, which, when the arm is in the position shown in Fig. 20, engages the stop lug 100 on the side of the wheel 98, and so checks said wheel against rotation. The direction of rotation which the driving mechanism tends to apply to it is indicated by an arrow. The outer end of the bent arm 305 is engageable under a pawl 307. This pawl is pivotally mounted on the end of a bracket 308 which projects from the arm 309 which is pivotally mounted in the standard at 310, and forms an upward extension of the armature 311, a tail piece 312 being provided to carry a retiring spring and adjusting pin similar to those shown as corresponding parts in Figs. 18 and 19. When the solenoid 313 is energized, the armature 311 is attracted, and the arm 309 with its bracket extension 308 is moved to the right. The pawl 307 is thus drawn away from the end of the bent arm 305, and leaves said arm free. Thereupon the upward pressure of the lug 100 against the lug 306 causes the arm 305 to kick upward and allow the lug 100 to pass the lug 306. As soon as these two lugs have cleared each other, the bent arm 305 drops by gravity back to its normal position, and if through rapid release of the armature the arm 308 has been already restored to its left hand position when the bent lever 305 so returns, the point of said lever trips past the pawl 307 and is engaged under it as shown in the drawing so that it is rendered impossible for the wheel 98 to make more than one complete rotation. On the other hand if the armature 311 is not released before the wheel approaches the completion of a revolution, the stop piece 312 on the upper end of the arm 309 is held in the path of the lug 99 and the movement of the wheel 98 is arrested a little before a complete rotation is completed, and meantime, the bent arm 305 falls back and is engaged by the pawl 307 when the armature release is completed. In this release movement of the armature, the stop 312 is drawn clear of the lug 99 and the wheel is permitted to finish its rotation, which is ultimately checked by the contact of the lug 100 with the lug 306.

It is found necessary to provide this form of trip and stop gear for the wheel 98 to insure that that wheel will be certainly freed and permitted to make a rotation when the armature is attracted and under no circumstances permitted to make more than one complete rotation for each movement of the armature.

The proportion of the gears 98 and 103 will determine the degree of rotation of the shaft 108 for each complete rotation of the wheel 98. Consequently, the high value control may be set by proportioning these gears for tickets at £5 each, or for any other particular required value, irrespective of the value represented by the toothing on the low value escapement wheels which are directly mounted on epicyclic boxes.

A hook 80 pivotally hung at 81 on the wheel 70 carries an offset finger 82, which runs in the joggled spiral track 30 on the side of the wheel 28. This hook is fitted with a spring heel 83 standing rearward of it and engageable with a chock 84 mounted on the fixed stud 85. The spring 83 serves to buffer the contact of the hook 80 with the stop 84, when said hook is in its outermost position, but if the spring be broken said hook can make direct contact with said stop. As long as the control finger 82 is running in the outer groove 30 of the spiral track the hook 80 is held in its outermost position so as to engage the stop 84 and the wheel 70 cannot then rotate. When, however, the wheel 28 is turned one or more rotations in advance of the wheel 70, the finger 82 runs into one of the inner grooves, thereby lifting the hook 80 and freeing the wheel 70 so that said wheel may be rotated through the wound up spring 72; it continues its rotation under the torsion applied by the spring 72 until the finger piece 82 again runs into the outer groove and brings the hook 80 down, so that it is intercepted by the stop 84, when further rotation of the wheel 70 is arrested. The joggling of the last convolution of the spiral track insures positive movement of the hook 80 from "free" to "lock" position and so obviates accidental slipping of said hook over the stud stop 84, which could occur if the track were a simple spiral track.

Figure 3:
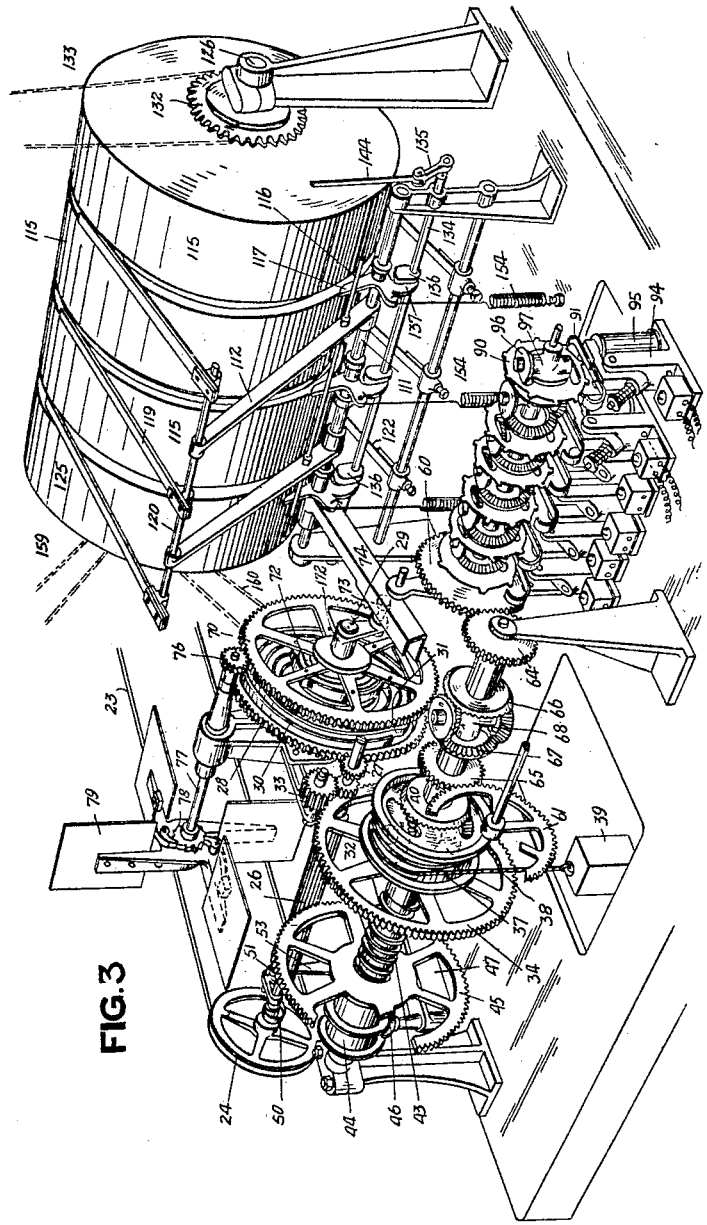
Fig. 3 is a perspective view corresponding with Fig. 2.

Triple arm hook levers 113—117—137 are centered loosely on the rock shaft 111; they are held in the position shown in Figs. 3 and 14 by spring 154 or by counterweights. The catch hooks 113 engage the gaps 320 in the interrupted flanges 114 on the left hand ends of the tens hundreds and thousands indicator drums 115. A rail 116 is secured to the gang of rock arms 112. These arms all move together. The rail 116 takes against the tails 117 of the triple levers. On each reciprocation of the lever 74, the rock arms 112 are advanced, and on the rail 116 making contact with the offset arms 117, the hook levers 113 are disengaged from the gaps 320 in the drum flanges 114. Immediately thereafter the drag claws 118 on the ends of the lightly hung pull arms 119, which are pivotally mounted on a gang bar 120 carried on the ends of the rock arms 112, engage the notches 320 on the flanges 114, and on the return movement pull around certain of the indicator drums 115 one tenth of a revolution. The heel stops 121 which are carried on spring arms 122 permit forward rotation of the drums in the direction indicated by the arrow, but check reverse rotation thereof. The tens and hundreds drums 115 are each fitted with a riding flange 123 (see Fig. 2) on its right hand end; on these flanges respectively ride rollers 124 laterally offset from the drag claw 118 which operates on the next higher drum of the series. Each flange 123 is joggled inward at one place (indicated on the other side of the drum in Fig. 23). When that place reaches the top position, which occurs when the drum indicates the digit "9," the drag claw 118, whose roller 124 is riding on such flange 123, is permitted to drop into the flange notch 320 in the adjacent higher drum, and to move that drum forward one tenth of a revolution, but when the non-interrupted portion of the flange 123 is in the said top position, the roller 124 runs over it and prevents the drag claw 118 from engaging the flange notch 320 of the adjacent higher drum. Decimal progression motion is thus applied to the hundreds and thousands drums in serial order. It is necessary however to provide that the thousands drum will be moved only in its proper sequence. This is effected by varying the form of the joggles in the drum flanges 123 on the hundreds drum in the way described in the specification of an earlier patent granted to me, which includes this structural feature.

The indicator drums turn freely on the shaft 126 on which they set side by side, with working clearance between them. On the side of each of them (except the unit drum) is mounted a bell crank lever 128 carried on a pin 166. This lever is controlled by a spring 129; said spring operates to hold the offset pin 127 in the end of the lever 128 in contact with the face of the cam 130. This cam is keyed or pinned to the shaft 126. One of these cams 130 and one of these levers 128 is provided for each drum except the unit drum. The cams 130 are pinned to the shaft 126. The unit drum when geared, as by chain belt 160, is brought to zero by releasing one of the escapements so as to permit it to advance to "0" from whichever figure it has indicated in the last operation. On the end of the shaft 126 a sprocket wheel 132 carries a chain 133 which is moved by a manually operated crank 140 (see Figs. 1, 16 and 17) to turn said sprocket 132, and with it the shaft 126. The rock shaft 134 with manually operated control lever 135 is fitted with cams 136, which act under the heels 137 of the hook levers 113, and serve to rock these levers so as to release the hook grips 113 on the drum flanges, which done, the shaft 126 may be turned by means of the gearing 133 and 132, with the result that the cams 130 are turned in the direction shown by the arrow Fig. 14, until the offset pins 127 are picked up by the cam jaws 138. One complete rotation is applied to the shaft 126, thereby bringing all the drums 115 so controlled to zero position. This done, the control gear 135 is released, allowing the hook levers 113 to again engage the flange notches 320 of the drums 115. The indicator drums are thus reset for further operation of the mechanism for another race.

Figure 1:
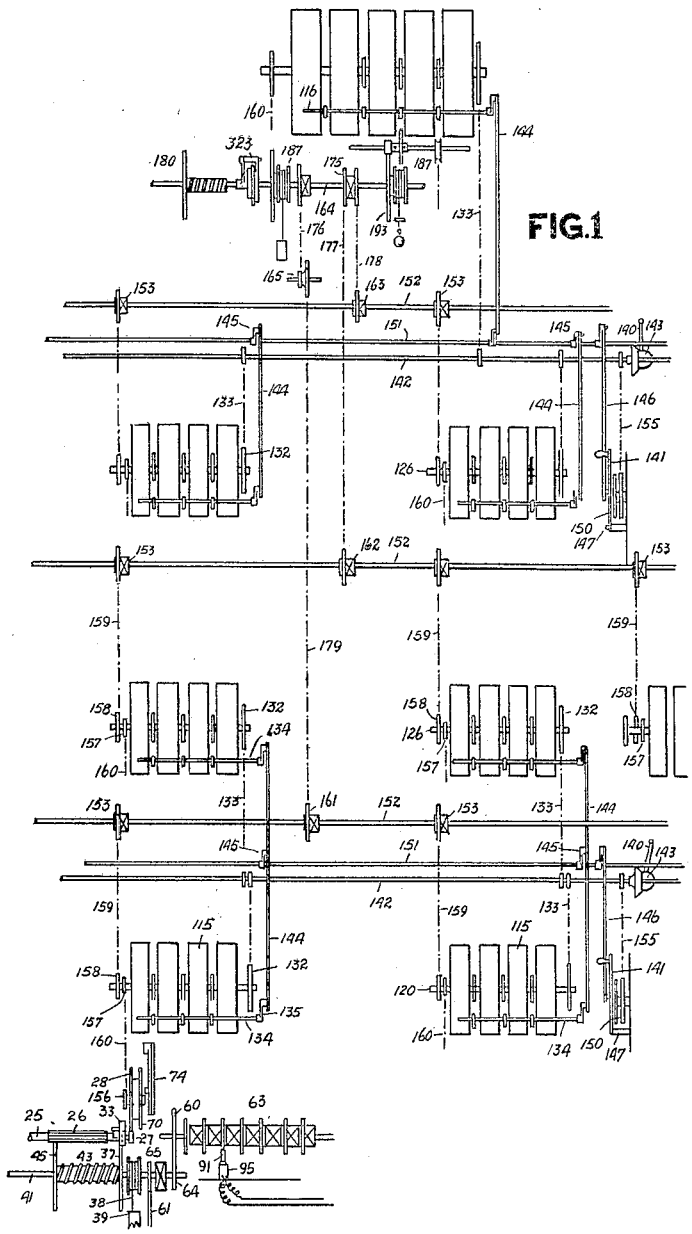

The arrangement of the resetting mechanism to enable complete resetting of all horse indicators and of the grand total indicator in one action is also shown in Figs. 1, 16 and 17. 140 is a hand crank, and 141 is a hand lever. The hand crank serves to rotate all the shafts 126 by chain gear from an intermediate shaft 142, to which said crank is geared by a bevel pinion 143. The hand lever 141 is link connected to the throw out gear 135 by rods 144 operated by lever arms 145 on a shaft 151, which is rocked by a push rod 146, and lever 171. The hand lever 141 is fulcrumed at 147, and an offset pin roller 148 upon it sets into the jaw 149 of a cam 161 keyed to the shaft of the sprocket wheel 150, which is chain geared to the shaft 142. In the locked position of the lever 141 shown in Fig. 16, all the resetting gearing is locked, inasmuch as the offset pin roller 148 standing in the open jaw 149 of the cam 161 locks the cam and the wheel 150, and through the gearing thereto locks all the drum shafts. The lever 141 is normally held in locked position by a spring 321 which is attached to a cranked tail piece 322 on said lever. When, however, the lever 141 is pulled off in the direction shown in the dotted line, the hand crank 140 may be turned, and all the gears thus operated to turn the several drum shafts 126, and thus reset all the drums (except the unit drums) in the system simultaneously. The lever 141 relocks itself when the wheel 150 has made one complete rotation. In Fig. 1 two resetting controls are shown, one governing one group of horse indicators, and the other governing another group of horse indicators and the grand total indicators. The number of such resetting controls required for satisfactory operation depends on the size and number of the indicator drums in the system.

The grand total accumulator shaft (see Figs. 4, 5, 6) carries an epicyclic train with drive connections thereto from the several horse counter elements in the totalizator, weight drive drums for turning said shaft, with automatic rewinding mechanism and check brake, a mechanical device 323 for temporarily storing and for translating the shaft movement into separate impulses each of one tenth of a revolution, so that the grand total indicator will be advanced step by step so as to display full figures, and a helical drum traverser similar to that used in the horse counter elements for accumulating and transferring received motions forward. This section of the apparatus includes a repetition of the mechanism which is intermediate the epicyclic trains and the indicators in the horse elements (Fig. 2) with certain additional parts.

The shaft 164 is subdivided into separate lengths which are coupled end to end through epicyclic boxes having sprocket wheels 175 fixed on their cheek wheels. These sprocket wheels 175 are driven from the horse counter unit drums through chain belts 176, 177, 178, from wheels 158 geared to the horse counter unit drum sprockets 157 via collector shafts 152, which integrate in the epicyclic boxes 161, 162, 163, the horse total movements received through the epicyclic gears 153 from the wheels 158. The box 161 is connected through an intermediate belt 179, and a reducing pinion and wheel 165. The delivery end of the shaft 164 is connected to the shaft 180 of the accumulator drum through the step by step mechanism (see Figs. 4 and 5), which comprises a fixed detent wheel 181, and arm 182 on the shaft 180, a spring pawl 183 pivotal on the end of the arm 182, and a tappet 184 on the pawl; also a barrel 185 fixed on the shaft 164, and a spiral spring 186 the eye of which is fixed to the shaft 164 and the tail to the arm 182 which is on the shaft 180. 487 is a tappet on the periphery of the drum 185 adapted to engage the striker 184 when the drum turns a predetermined amount relatively to the arm 182. As the shaft 164 rotates in an irregular continuous motion, the spring 186 is wound up, revolution of the arm 182 which it tends to carry with it being checked by the pawl 183, which is engaged with a tooth of the fixed detent wheel 181. When the tappet 487 moves the tail 184 of the pawl and so lifts the pawl, the tension of the wound up spring 186 moves the arm 182, and the shaft 180 and those parts then turn a distance equal to one tooth spacing (i. e. one tenth of a revolution) of the detent wheel 181, when the motion is arrested by the pawl 183 engaging the next tooth 181. Consequently the shaft 180, the helical drum 43$^a$ which it drives, and the grand total indicator to which the motion is transmitted through the helical drum accumulator, all move intermittently in uniform measure, and the grand total indicator is thus advanced one figure at every movement; its drums cannot come to rest "between figures" so as to exhibit an indefinite total. As shown in Fig. 1 a chain gear 160 is provided for resetting the grand total unit drum.

The grand total integrating shaft 164 is turned by weight gear, an appropriate number of gears being fitted to it having regard to the number of sections in the shaft and the number of epicyclic boxes carried thereon. The weight drums 187 are mounted on rotors which carry the star wheels of the epicyclic boxes. The weight cords 188 are wound around these drums and suitable weights are suspended on the ends of said cords. The shaft moves permissively according to the motions applied to the chain drives 176, 177, 178 through the horse elements, the drum gear providing local motive power for turning the shaft 164 and the parts which it drives, thus performing for the grand total mechanism the same function as is performed by the weight gear 39 forming part of the horse elements already described with reference to Fig. 2.

The drums 187 are rewound automatically as the cord weights run down and the brake 195 is applied to slow up the rotation of the shaft 164, when it tends to turn too rapidly. An electric motor controlled by a rheostat 222 controls the circuit of the motor. The arm 223 of this rheostat is connected by a link 224 to the bell crank 225. The weight cord 188 runs through a hole in the power end of the bell crank 225 and the cord weight 226 takes against the underside of the bell crank 225 so as to lift it when the cord is normally fully wound on the drum 187. A counterweight 227 hung to the bell crank 225 operates to pull it normally downward and thereby cause the contact arm 223 to traverse over the rheostat contacts to govern the motor speed; the lowest contact on the rheostat passes only sufficient current to keep the motor (which is not shown) in slow rotation, the belt 189 which connects the motor to the pulley wheel 190 on the end of the counter shaft 191 being tensioned to slip slightly. The pinion 192 on the counter shaft 191 gears with the spur wheel 193 on the shaft 164. When the motor is rotating and the shaft 164 is free, the wheel 194 is turned by the gear 192—193. The wheel 193 is mounted on the cheek 228 of the cord drum 187, and, when it turns, operates through the epicyclic gear in the drum 187 to rewind the drum and draw up the weight 226 until said weight trips the bell crank 225 and pulls off the contact lever 223 to the lowest notch on the rheostat. The bell crank 225 has its fulcrum on the rock shaft 229; said shaft is carried in bearings not shown, and an offset arm 230 from said shaft 229 is connected to the adjustable slotted link 198. This link acts on the brake lever 196 to lift it and force the brake shoe 195 against the face of the brake wheel 194, said brake wheel being pinned to the shaft 191. Normally the brake lever 196 is pulled off by the helical tension spring 231. The operation of the parts described is therefore to maintain the weight 226 floating; it moves up and down within a short range, operating the rheostat arm 223 to control the motor speed, and operates also the brake shoe 195 to bring the shaft 191 slowly to rest and hold it at rest when the cord is fully wound on the drum 187.

In practice it will be found sufficient to provide one weight drum 187 and the accessory parts just described in connection therewith to deliver power to the end of the shaft 164 which is distant from the accumulator and regulating gear now to be described. A similar weight drive is provided at the last mentioned end of the shaft 164, as will be now described, but in any case in which the shaft 164 is of great length and carries a larger number of epicyclic boxes, additional weight drums and accessory gearing as last described may be fitted at one or more intermediate positions thereon.

The helical barrel 43ª which is pinned on the end of the shaft 180 which is connected to the shaft 164 through the intermittent motion gear already described with reference to Figs. 4 and 5, is fitted with a wheel and traversing nut corresponding with 45—44 already described with reference to Fig. 2 and said wheel gears with a drum pinion similar to 26, which is connected up to a motor such as 20 by the same mechanical device as shown in Fig. 2. In Fig. 4 the wheel 232 corresponds with the wheel 34. (Fig. 2). It is unnecessary to illustrate again the detail of the mechanical arrangements which have been already shown fully in Fig. 2, as in this case they are duplicated, the operations and functions being identical throughout. 233 is the rheostat which controls the motor which supplies power to the shaft 164 to the parts beforementioned. The final motion of the shaft 164 made up of the aggregates of motion permitted to it in the manner already described, is transmitted from said shaft 164 to the grand total indicator by mechanism corresponding with that by which the motion of the shaft 41 is finally applied to the horse indicators as already described with reference to Fig. 2.

Where a very large number of ticket selling booths is included in the system, and provision must be made to permit rapid selling of tickets in a number or all of these booths simultaneously, the service demanded of the total accumulating and transferring mechanism is very exacting, and in that case special provision must be made to enable the mechanism between the accumulator 43 and the indicators to come into action and cease action rapidly, and to effect the transfer more rapidly than is necessary in the case of a smaller installation. In the arrangement already described, a certain amount of time is lost in bringing the motor 20 up to speed, and further time is lost in providing for a gradual slowing down of the transfer movement to allow the motor to come to rest easily. To qualify the apparatus for operating under heavy load conditions such as I have just indicated, the motor is maintained in rotation at its normal rate continuously, and the traversing nut in the accumulator 43 is made to operate a lever and link gear which traverse a friction pinion between the driving and the driven disk, the driving disk being on the motor shaft and the driven disk belt connected to the shaft 25.

When the nut 44 is in the idle position, the friction pinion is in the neutral position.

As the nut 44 is traversed on the helical drum 43, the friction pinion is drawn across the face of the driving disk 253 toward its periphery and toward the center of the driven disk 259, thereby multiplying up the motor rotation and driving the shaft 25 at a proportionately fast rate. The mechanism is similarly slowed down without slowing down the motor. This accessory feature is illustrated in Figs. 22, 23, 24 and 25. 240 is a bell crank lever, the power end of which is formed with a finger 241 which runs in the groove in the nut 44. The work end 242 of this bell crank lever is link connected at 243 through a lever arm 244 to a rock shaft 245; said rock shaft is connected by an arm lever 246 and link 247 to a sliding carrier 248 on which bearings 249 are fitted to carry the free running friction pinion 250. The bearings 249 are contained in brackets on the carrier 248 as shown at 251. The slider 248 runs through bearings 252, on the base plate. The friction drive disk 253 is mounted on the shaft 254 which is belt driven with a tight belt from the motor and runs at uniform maximum velocity. 255 is a ball thrust bearing. 256 is a ball thrust bearing seated against the bearing 257 which carries the shaft 258 of the driven disk 259. 260 are adjusting nuts on the shaft 258 for compressing between them and the ball bearing 256 a helical spring 261. This spring operates to push the shaft 258 endwise with pressure regulated by the tension on the spring 261, and so maintain uniform pressure between the friction contact faces of the disks 253 and 259 and the pinion 250 to insure a non-slip drive. The rheostat 21, Fig. 2, is omitted from this assembly, but in place of it a quick break knife switch is fitted which is shown at 262; 263 being a fixed contact; 264 the spring held blade, and 265 a rocking base in which the blade 264 is mounted; said base 265 is normally held by a spring 266 in the position shown in full lines. While the nut 44 is in any position on the helical drum 43 other than near the right hand end of it, the switch 262 is closed, and the motor circuit completed. The shaft 254 is then running at normal speed and the position of the pinion 250 between the driving disk 253 and the driven disk 259 is determined by the position of the nut 44 and the consequent angular position of the bell crank lever 240—242. When the accumulating of motions is happening very rapidly, the nut 44 traverses the drum 43 at a fast pace, which in the construction shown in Fig. 2, would cause it to overtake the resetting motion of the drum 43. In the case of this assembly, the traverse of the nut 44 brings about a forward movement of the friction pinion 250, so that the disk 259 and the mechanism driven through it are soon brought up to a high speed, and similarly the motion of the parts is slowed down by the retiring of the pinion 250, without however affecting the speed of the shaft 254. The throw-out switch 262, however, provides a safety device to meet a possible case where the transfer of motions from the epicyclic trains is abnormally rapid. In that case a striker finger 270 on the bell crank arm 240 engages the rocking arm 265 of the switch, forcing it to the position shown in dotted lines and opening the common return circuit for all the electrical connections through the issuing machines to the electromagnets which control the several escapements. Further addition of motions to the accumulator is thus arrested temporarily, and operation of all the issuing machines is momentarily checked owing to interruption of the current therein until the accumulator unloads a sufficient portion of its charge on to the indicators to permit the nut 44 to traverse backward, carrying with it the bell crank arm 240 and allowing the switch 262 to be restored by the spring 266, thus again closing the electro-magnet circuit and placing the issuing machines again in operative condition.

It will be noted that owing to the snap action of the switch 262 and the clearance between the arm 240 and the switch a certain amount of traverse is permitted the nut 44 before the switch 262 is thrown open. A period of pause in the movement of the switch 262 is thus insured by the snap action blade, preventing "wavering" of the switch, which might otherwise be possible when the rate of unloading of the accumulator is about equal to the rate of changing.

This variable speed drive in the transmission is obviously equally applicable to the horse elements, and to the grand total element, the connection between the drive mechanism and the transmission being in principle identical in the two cases.

It will be observed that the assembly mounted on the shaft 29 is duplicated in the escapement shown in Fig. 22. The motion of the barrel pinion 26 passes first to the wheel 28, the motion of said wheel being carried by a chain belt 160 to the unit drum of the indicator. The shaft 29 is geared at 272 to the wheel 273, which, like the wheel 28, carries on the side of it a spiral track 274, the purpose of which has been already described. The spindle 275 carries a sprocket 276 which is connected by a chain belt 277 to the tens drum 278 of the indicator. The ratio of the gearing between the shafts 29 and 275 is 10:1.

The sprocket and gear wheels throughout the system are proportioned to transmit appropriate relative movements so that the indicator movements represent the values and not the number of the individual movements received into the apparatus through the escapement controls. In certain cases it is found advisable, as at 165 Fig. 1, to introduce an intermediate gear to set down the speed of the driven elements.

In the grand total mechanism, the accumulator shaft and gearing shown in Fig. 4 takes the place of one or more groups of escapement controlled epicyclic trains which are used in the horse totals for receiving initial movements transmitted thereto by the ticket issuing clerks. The accumulator shaft 164 receives through the epicyclic gears thereon movements from each of the several horse total mechanisms, and it accumulates said movements during the totaling thereof, and operates through mechanism similar to that used in connection with the horse gears to move the grand total indicator.

The governor shown in Figs. 7 to 9ª is associated with the shaft 25, and its purpose is to govern the rotations of that shaft in such a way that it may speed up rapidly but can come to rest during the last few rotations at a slow rate, thereby increasing the capacity of the accumulator, by qualifying it to act with maximum rapidity in its receiving and delivering actions.

Figs. 7 and 7ª read with Fig. 2. The lever 47 is in this case fitted with two check studs 280 and 281 which respectively engage two adjustable check studs 282 and 283. One of these pairs of checks controls the rocking pillar 53, which rocks the striker 52, this striker being engaged by the catch tooth 51 carried on an arm 49 and supported by a spring 50 in the manner shown in Fig. 12. The other contact is on the top end of a rocking arm 284 which is connected by a link 285 with two arms 286 pivotally mounted on the base at 342. These arms carry fingers 287 which are armed at their upper ends with brake shoes 288, said brake shoe being positioned to engage the disk 289 near its periphery. Normally the disk 289 is held out of contact with the shoes 288 by means of the helical springs 290 on the carrier studs 291, by which said disk is mounted on the welt wheel 24. The disk 289 is formed with a hub portion 292 which is slidable on the hub 293 of the wheel 24. A drum 294 is formed on the outer side of the wheel 24, and in it are mounted two centrifugal governor weights 295 (Fig. 9ᴬ) which are normally held inward by a helical spring 296.

The ramps 297 on the wing pieces on the sides of the weights 295 act against rollers 298 on the hub 292 of the disk 289. The movement of the weights 295 under centrifugal action will be fully understood on reference to Fig. 8. The outward movement due to increase in speed of the wheel 24 causes the ramp faces 297 to ride on the rollers 298 and push the disk 289 inward against the pressure of the retiring springs 290. This is the position of affairs when the nut 44 is traversed to the right on the helical drum 43. In this position the outward displacement of the disk 289 does not produce any braking effect. When, however, the lever 47 is being brought back to its normal left hand position, it engages the stop 283 and swings the arms 287, thereby bringing the brake shoes 288 into contact with the face of the disk 289, causing it and the wheel 24 to come to rest rapidly. The final stopping of the rotation of the shaft 25 is controlled by the action of the check 282 which brings the striker 52 under the tooth 51, thus arresting the rotation of the shaft 25 at precisely the required position, and bringing the parts of the transmission and of the indicators always to an identical position when idle, thus centering the indicator figures for public observation. The friction wheel drive system with motor always working at full speed which has been described with reference to Fig. 22 may be substituted in the simpler arrangement of mechanism shown in Fig. 2, to replace the slipping belt and varying speed motor arrangement described with reference to Fig. 2.

There is no difference between the grand total indicators and the horse total indicators, except that in the case of the grand total indicators, in large installations, the units and tens wheels are chain-belt driven from elements in the transmission mechanism which are turned at proportionate speeds, one and ten respectively, and the pull rod advance mechanism 119 (see Fig. 3) is applied to the hundreds and thousands drums and also to the ten-thousands and hundred-thousands drums if the capacity of the system requires these latter drums in the indicator. The unit drum in the grand total indicator may be left idle until the finish of the count, and then set manually to show the correct final digit of the count.

It is desirable in certain positions where rapid rotary motions occur at irregular intervals, to provide a means for slowing up these motions just before they become complete in order to avoid vibratory and impact stresses in the mechanism. Thus, for instance, where a £5 or "all round" escapement wheel is fitted on any of the epicyclic train shafts, the rapid rotation of such shaft, which occurs when such escapement is released is braked before the rotation is complete, by means of a dash pot 300 (similar to 105 shown in Fig. 2, where 98 is an all round escapement wheel and 105 a dash pot fitted with a plunger working in said dash pot) crank connected to a disk 301 on the end of the shaft 29. A similar dash pot may also be fitted at the end of the shaft 29, (Fig. 3) a disk on the end of that shaft carrying the plunger pitman. In the Figs. 2-3, arrangement a dash pot is not essential to govern the shaft 29, but in the Fig. 22 arrangement, a dash pot is provided to govern the shaft 29 and an air vane governor 330 similar to 79 Fig. 2 is fitted on the shaft 77.

In practice it is found that when an apparatus constructed as herein described is operated under practical working conditions, the escapement mechanisms release freely at the highest practicable ticket issuing velocities, and the accumulating, integrating, relaying, transferring, and stepping down of the movements enables the intermediate and indicator mechanisms to act freely, almost noiselessly, and without shock or inertia stresses, notwithstanding sudden acceleration and deceleration of any movements caused by rapid or irregular transmission of motion to the initial elements in the machine or within the system. The apparatus also being of a very compact form may be fitted in units which may be added to a unit system without disturbing any of the assembly previously set up. The grand total accumulator shaft is capable of receiving movements from an indefinite number of horse totalizators, and each horse totalizator is capable of being set up to receive working impulses from and to indicate totals from as large a number of issuing offices as will be called for under any extreme conditions of working.

While I have shown and described electrical means for operating escapements in the primary epicyclic trains from the ticket issuing machines, I wish it to be understood that mechanical connections may be substituted for the said electrical means without necessitating any substantial alteration in any of the mechanism herein described. Certain features, as for instance, the knife switch overrun control shown in Fig. 22, are not usable when escapement rockers are mechanically operated, but for such features equivalent mechanical features may be substituted.

What I claim as my invention and desire to secure by Letters Patent is:—

1. In the totalizator counter and indicator which includes intergeared epicyclic trains in each horse element and control escapements on the epicyclic rotors actuated by connections from ticket issuing mechanisms, an accumulator device receptive of the aggregate of motions of said epicyclic trains, a floating weight drive associated with such accumulator and a back gear rewinding mechanism therefor driven by a pinion to which the accumulator delivers up the received motions, means for applying drive to said pinion and for arresting its motion when the accumulator has discharged itself therethrough of the motions received by it from said epicyclic trains, means governed by the rate of motion of the epicyclic trains for speeding up and slowing down the accumulator, a primary transfer wheel geared to said pinion and a secondary transfer wheel connected therewith through a spiral spring, means for bringing said secondary transfer wheel to rest when the rotations transmitted to it through said spiral spring have been delivered by it, a chain belt gear connecting the spindle of said primary transfer wheel with the unit drum of an indicator and transmitting said rotations to such indicator and means for transferring to the tens drum of the indicator one decimal advance movement for every complete rotation of said secondary transfer wheel.

2. A totalizator counter and indicator comprising in sequence escapement governed epicyclic trains for transmitting ticket issuing movements from a plurality of ticket issuing booths, a motion accumulator directly connected through an epicyclic box or boxes to said epicyclic trains, means including a governor for taking off the accumulated motions from said accumulator and delivering the same through intermediate gear to the unit and the tens drums respectively of horse indicators, chain belt gearing from the unit drum shafts of said horse indicators to an epicyclic train on a grand total integrating shaft, a motion accumulator associated with said shaft and mechanism therewith for translating irregular continuous motion into intermittent motion and transferring the same to a grand total indicator, floating weight drive mechanism acting through epicyclic boxes on said grand total integrating shaft and on the primary accumulator shaft, and back gearing operating to rewind said weight gear.

3. A totalizator wherein the ticket issuing motions are primarily transmitted to a motion accumulator in each horse element through escapement controlled epicyclic trains, horse indicators turned by intermediate gearing from the said accumulators respectively; gearing from said indicators to an epicyclic train on a grand total integrating shaft which shaft is adapted to carry any number of epicyclic elements, and is associated with a motion accumulator, and a grand total indicator operated through intermediate gearing from said grand total integrating shaft.

4. In a totalizator apparatus of the type herein described, the combination with an accumulator adapted for simultaneously receiving ticket issuing motions at an intermittent and irregular rate and delivering up said motions at a distributed rate, an indicator transfer mechanism between said accumulator and the indicator, said mechanism being fitted with a maximum speed governor and including a spiral spring connection with a crank wheel to which said governor is geared, the primary wheel of said transfer gear being connected to the unit drum of said indicator, and the secondary spring driven wheel thereof through reciprocating gearing to the tens drums of said indicator.

5. In a totalizator of the type herein described, the combination with a barrel pinion, an accumulator geared to the barrel pinion, and an indicator, of a mechanism intermediate said accumulator and the indicator and controlled by the accumulator motion, and means operated by the said mechanism adapted to arrest the drive thereto through said pinion when the accumulator is unwound and to liberate said drive while the accumulator is rewound.

6. In totalizator apparatus of the type herein described, the combination with an indicator, an accumulator drum pinion, a mechanism intermediate the accumulator drum pinion and the indicator, comprising a unit and tens drum carried by the indicator, a driven gear wheel which is directly connected to the unit drum of the indicator, a crank wheel, a spirial spring intermediate said gear wheel and the crank wheel, reciprocating mechanism driven by said crank wheel adapted for applying intermittent decimal progression to the tens drum of the indicator, a high geared speed controlling governor geared to said crank wheel, and means for arresting the motion of said crank wheel when the rotations transferred to it through the spiral spring have been delivered to the indicator; said means comprising a spiral joggled track on the side of said crank wheel, and a runner working in said track and controlling a stop check.

7. In the totalizator apparatus of the type herein described, an accumulator drum pinion, motor drive through a slipping belt to the accumulator drum pinion, a motor circuit, an accumulator nut, a rheostat controlling the motor circuit operated by the traverse of the accumulator nut, and a check for arresting the motion of the drum pinion and holding the drive, said device being also operated by the traverse of the accumulator nut, substantially as herein described.

8. In a totalizator including an accumulator drum, means for delivering the totality of the ticket issuing motions to a motion accumulator drum, a floating weight drive for the motion delivering elements, and rewinding mechanism for said weight drive comprising an epicyclic box and a gear on one cheek wheel thereof driven by back gear from the accumulator drum pinion, substantially as herein described.

9. In totalizator mechanism of the type herein described, means whereby motions transferred from ticket issuing devices at irregular rates are transmitted through a motion accumulator to the indicating mechanism at a distributed and progressively varying rate, said means comprising an electric motor drive operating the accumulator and the transmission, a rheostat controller for the motor circuit, and means for changing the rheostat contacts progressively in timing with the difference between the rate of transmission of motion to and from said accumulator.

10. A totalizator mechanism of the type herein described, comprising a ticket issuing mechanism, an accumulator adapted to receive motions caused by the ticket issuing mechanism, said accumulator adapted to deliver said motions therefrom at a distributed rate progressively increasing and diminishing with the rate of such receipt driving means for the accumulator and transfer mechanism consisting of a floating pinion friction drive between a driving disk maintained permanently in rotation and a driven disk, said floating pinion being moved to vary the gear ratio between said disks by means of a connection to a traversing nut in the accumulator mechanism, whereby the drive is accelerated and retarded proportionate to the load on the accumulator.

11. In totalizator mechanism of the type herein described, comprising an accumulator drum pinion, a floating friction pinion drive, a lever for moving said pinion drive, and a transversely movable nut operated by the accumulator for moving the lever, substantially as described.

12. In totalizator mechanism of the type herein described, indicators, transfer mechanism intermediate the accumulator and the indicators, comprising in series two spring drum drives motion arresting gears geared thereto, a dash pot on the shaft of the first of said drives, and an air vane governor geared up to the driven element of the other of such drives, a chain gear from the first of said drives to the unit indicator, and a chain geared from the other of said drives to the tens drum of such indicator and reciprocating mechanism operated by the second of such drives acting on the indicator drums higher in series than the said tens drum.

13. In combination with totalizator apparatus substantially as shown, comprising an accumulator, a traveling nut in said accumulator, a circuit, an escapement mechanism, a quick break knife switch controlled by the traverse movement of the accumulator unit, governing the return circuit of the escapement mechanism, and ticket issuing machines adapted to be arrested when the accumulator is over-loaded.

14. In a device of the character described, the combination with an accumulator drum pinion, of a centrifugal governor driven by the accumulator drum pinion, and means for arresting the rotation of the accumulator when it is overloaded, substantially as described.

15. An escapement control for an epicyclic train shaft in totalizator mechanism, comprising a wheel, alternate lugs carried by the wheel, an armature, stops carried by said armature and engaging the lugs, a lever, a trip pawl carried by the armature and engaging said lever, for the purpose described.

16. In an apparatus of the character described, a shaft assembly, a grand total indicator, a transmission mechanism, controls between the indicator and transmission mechanism, a floating weight drive for the transmission, rewinding mechanism for the weight drive, a horse total unit drum and epicyclic boxes chain geared to the horse total unit drum, substantially as described.

17. In totalizator mechanism of the type herein described, comprising ticket issuing mechanism, a grand ticket issuing mechanism, a grand total indicator, means for integrating the ticket issuing movements and transmitting them to the grand total indicator, motion receiving devices, means intermediate the ticket issuing element and the grand total indicator and associated with the driving mechanism of such indicator for transmitting the irregular rotational movements of the motion receiving devices in the transmission into intermittent movements and means for transferring said movements to said indicator thereby effecting step by step progression in the rotation of the indicator.

In testimony whereof I affix my signature in presence of two witnesses.

GEORGE ALFRED JULIUS.

Witnesses:
W. J. HUMPHREYS,
H. C. CAMPBELL.